US007649599B2

(12) United States Patent
Kim et al.

(10) Patent No.: US 7,649,599 B2
(45) Date of Patent: Jan. 19, 2010

(54) LIQUID CRYSTAL DISPLAY PROVIDED WITH COMPENSATION FILM

(75) Inventors: Tae-Hwan Kim, Seoul (KR); Young-Chol Yang, Kunpo (KR); Sang-Il Kim, Suwon (KR)

(73) Assignee: Samsung Electronics Co., Ltd. (KR)

( * ) Notice: Subject to any disclaimer, the term of this patent is extended or adjusted under 35 U.S.C. 154(b) by 420 days.

(21) Appl. No.: 10/510,077

(22) PCT Filed: Apr. 3, 2003

(86) PCT No.: PCT/KR03/00667

§ 371 (c)(1), (2), (4) Date: Dec. 19, 2005

(87) PCT Pub. No.: WO03/085949

PCT Pub. Date: Oct. 16, 2003

(65) Prior Publication Data

US 2006/0098145 A1 May 11, 2006

(30) Foreign Application Priority Data

Apr. 4, 2002 (KR) ...................... 10-2002-0018580

(51) Int. Cl.
*G02F 1/1335* (2006.01)

(52) U.S. Cl. ...................................... 349/119; 349/117

(58) Field of Classification Search .......... 349/117–119
See application file for complete search history.

(56) References Cited

U.S. PATENT DOCUMENTS 5,499,126 A 3/1996 Abileah et al.
5,504,603 A * 4/1996 Winker et al. ............... 349/117
5,557,434 A 9/1996 Winker et al. ................. 359/73
5,818,615 A 10/1998 Abileah et al.
5,940,155 A * 8/1999 Yang et al. .................. 349/120
5,982,465 A 11/1999 Saxena et al. ............... 349/119
5,986,733 A * 11/1999 Winker et al. ............... 349/120
6,169,590 B1 1/2001 Abileah et al.
6,812,983 B2 * 11/2004 Arakawa .................... 349/117
6,822,713 B1 * 11/2004 Yaroshchuk et al. ........ 349/117
7,324,180 B2 * 1/2008 Kashima ..................... 349/117
2007/0243340 A1 * 10/2007 Umemoto et al. ............ 428/1.1

FOREIGN PATENT DOCUMENTS

CN 1128360 8/1996

(Continued)

OTHER PUBLICATIONS

International Search Report dated Sep. 11, 2003 for Application No. PCT/KR03/00667.

*Primary Examiner*—Michael H Caley
(74) *Attorney, Agent, or Firm*—Cantor Colburn LLP

(57) ABSTRACT

An LCD according to an embodiment of the present invention includes a liquid crystal panel assembly including two panels facing each other and a liquid crystal layer interposed between the two panels and having positive dielectric anisotropy. A pair of polarization films are attached to the outer surfaces of the liquid crystal panel assembly, respectively. A positive or negative a-plate compensation film having reverse wavelength dispersion that ¥Än increases as the light wavelength increases and a negative hybrid c-plate compensation film are inserted between the liquid crystal panel assembly and each of the polarization films.

8 Claims, 7 Drawing Sheets

FOREIGN PATENT DOCUMENTS

| | | |
|---|---|---|
| CN | 1281999 | 1/2001 |
| JP | 04003018 | 1/1992 |
| JP | 04343303 | 11/1992 |
| JP | 05045520 | 2/1993 |
| JP | 06258635 | 6/1994 |
| JP | 07333599 | 12/1995 |
| JP | 11264977 | 9/1999 |
| JP | 2000039610 | 2/2000 |
| JP | 2000-137116 | 5/2000 |
| JP | 2001117099 | 4/2001 |
| JP | 2001147324 | 5/2001 |
| JP | 2002048919 | 2/2002 |
| KR | 1020010090961 | 10/2001 |
| KR | 1020010096160 | 11/2001 |
| KR | 2001-111823 | 12/2001 |
| WO | 0026705 | 5/2000 |
| WO | WO 01/20392 A1 | 3/2001 |
| WO | 0190808 | 11/2001 |

* cited by examiner

Fig. 5

| conventional (40nm) | | | |
|---|---|---|---|
| upper | 58 | lower | 60 |
| left | >80 | right | >80 |

| reverse wavelength dispersion (40nm) | | | | reverse wavelength dispersion (35nm) | | | | reverse wavelength dispersion (30nm) | | | | reverse wavelength dispersion (25nm) | | | | reverse wavelength dispersion (20nm) | | | |
|---|---|---|---|---|---|---|---|---|---|---|---|---|---|---|---|---|---|---|---|
| upper | 58 | lower | 64 | upper | >80 | lower | 70 | upper | >80 | lower | 70 | upper | >80 | lower | 70 | upper | >80 | lower | 70 |
| left | >80 | right | >80 | left | >80 | right | >80 | left | >80 | right | >80 | left | >80 | right | >80 | left | >80 | right | >80 |

LIQUID CRYSTAL DISPLAY PROVIDED WITH COMPENSATION FILM

BACKGROUND OF THE INVENTION (a) Field of the Invention

The present invention relates to a liquid crystal display, and particularly to a liquid crystal display provided with a compensation film.

(b) Description of the Related Art

A typical liquid crystal display (LCD) includes two upper panels provided with two kinds of electrodes generating an electric field and a liquid crystal layer interposed therebetween. The two kinds of the field-generating electrodes are supplied with electric voltages and the voltage difference therebetween causes electric field. The variation of the electric field changes the orientations of liquid crystal molecules in the liquid crystal layer, and thus it changes the transmittance of light passing through the liquid crystal layer. As a result, the LCD displays desired images by adjusting the voltage difference between the field-generating electrodes.

The liquid crystal material has birefringence that the refractive indices along a molecular long-axis direction and a molecular short-axis direction are different from each other. Due to the birefringence, the refractive index experienced by incident light is varied depending on the viewing direction of an LCD. Therefore, the color characteristic and the light transmittance in an oblique view are different from those in a front view since a linearly-polarized incident light passes through different paths of the liquid crystal layer to have different phases in its polarization.

Therefore, the LCD containing liquid crystal material has several problems such as the change of the contrast ratio depending on the viewing direction, color shift, gray inversion, and etc. In particular, such problems are severe in a twisted-nematic mode LCD, in which liquid crystal molecules are arranged such that their long axes are parallel to the panels while they are twisted spirally along a direction perpendicular to the panels in absence of applied field, and they tend to align parallel to an applied electric field perpendicular to the panels.

It is suggested that at least one retardation film (or phase difference compensation film) is attached to the twisted-nematic mode LCD. The retardation film solves the problem by compensating the phase difference of the light in the several directions.

However, the retardation film does not solve blue shift problem in a black state.

SUMMARY OF THE INVENTION

An object of the present invention is to minimize the blue shift of a liquid crystal display.

According to an embodiment of the present invention to achieve these and another objects, at least one positive or negative a-plate compensation film having reverse wavelength dispersion that $\Delta n$ increases as a light wavelength increases is provided on upper and/or lower surface(s) of a liquid crystal panel assembly.

Preferably, the liquid crystal display further includes hybrid c-plate compensation film(s) including compound having negative dielectric anisotropy and containing discotic molecules aligned such that their optical axes make decreasing angles with the normal to the panels as they go farther from a liquid crystal layer.

An a-plate compensation film having reverse wavelength dispersion and a hybrid c-plate compensation film is preferably attached to each outer surface of the liquid crystal panel assembly. The liquid crystal display selectively includes a-plate compensation film(s) having forward wavelength dispersion inserted between the liquid crystal panel assembly and polarization film(s).

The a-plate compensation film(s) having reverse wavelength dispersion may have biaxiality and satisfy a condition that $|ny-nz|<0.1*|nx-nz|$.

Moreover, it is preferable that the retardation value of a-plate compensation film having reverse wavelength dispersion ranges about 5 nm through about 45 nm for a light wavelength of about 550 nm, about (0.4-0.7)*(the retardation value for the light wavelength of about 550 nm) for a light wavelength of about 400 nm, and about (1.1-1.4)*(the retardation value for the light wavelength of about 550 nm) for a light wavelength of about 650 nm.

BRIEF DESCRIPTION OF THE DRAWINGS

The above and other advantages of the present invention will become more apparent by describing preferred embodiments thereof in detail with reference to the accompanying drawings in which:

FIG. 5 is a table showing viewing angle characteristics as function of types and the retardation value of a compensation film of an LCD.

DETAILED DESCRIPTION OF PREFERRED EMBODIMENTS

Figure 1A:
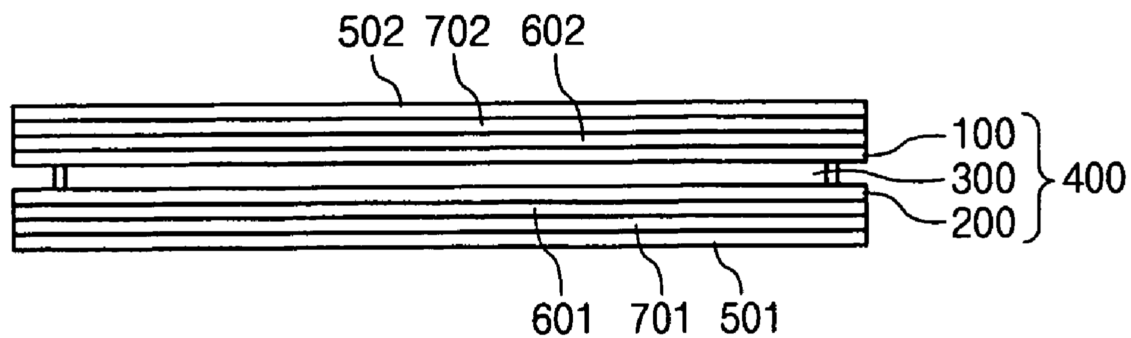
FIG. 1A is a sectional view schematically showing an LCD according to ari embodiment of the present invention.

The present invention now will be described more fully hereinafter with reference to the accompanying drawings, in which preferred embodiments of the inventions invention are shown. The present invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Now, an LCD according to embodiments of the present invention will be described in detail with reference to the accompanying drawings.

Figure 1B:
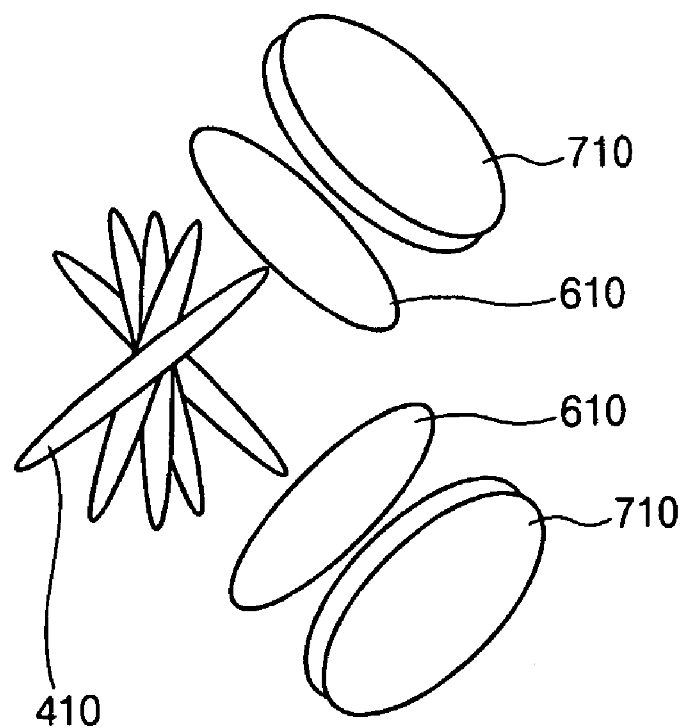
FIG. 1B shows the molecular arrangement of a liquid crystal layer and a compensation film of an LCD according to an embodiment of the present invention.

FIG. 1A is a sectional view schematically showing an LCD according to an embodiment of the present invention, and FIG. 1B shows the molecular arrangement of a liquid crystal material in a liquid crystal layer and a compensation film of an LCD according to an embodiment of the present invention.

As shown in FIG. 1A, an LCD according to an embodiment of the present invention includes a liquid crystal panel assembly 400 including two panels 100 and 200 facing each other and a liquid crystal layer 300 having positive dielectric anisotropy which is interposed between two panels 100 and 200. In addition, a pair of polarization films 501 and 502 are attached on the outer surfaces of the liquid crystal panel assembly 400, respectively. A positive or negative a-plate compensation film 601 or 602 and a negative hybrid c-plate compensation film 701 or 702 are inserted between the liquid crystal panel assembly 400 and each of the polarization films 501 and 502. The a-plate compensation films 601 and 602 have reverse wavelength dispersion that birefringence An increases as the wavelength of incident light increases. It is preferable that a liquid crystal cell gap, which is the distance between the two panels 100 and 200, is in a range of about 3.5-4.5 microns and the retardation value $\Delta n*d$ of the liquid crystal layer 300 is in a range of about 0.35-0.48 microns.

The liquid crystal molecules 410 of the liquid crystal panel assembly 400 are aligned such that their long axes twist from one panel 100 to the other panel 200 while they are parallel to the panels 100 and 200 in absence of applied electric field as shown in FIG. 1B. Although it is not shown in the figures, since the liquid crystal layer 300 have positive dielectric anisotropy, the liquid crystal molecules 410 tend to align their long axes parallel to the field direction of an applied electric field perpendicular to the panels 100 and 200.

According to another embodiment of the present invention, the liquid crystal layer 300 has negative dielectric anisotropy and has vertically aligned structure that the long axes of the liquid crystal molecules are aligned perpendicular to the panels in absence of applied field. It is preferable that the liquid crystal cell gap of the vertically aligned mode LCD is in a range of about 3.5-4.0 microns and the retardation value of the liquid crystal layer is in a range of about 0.25-0.35 microns.

Referring to FIG. 1B, the hybrid c-plate compensation films 701 and 702 include discotic molecules, which are arranged such that their optical axes make smaller angles with the normal of the panels 100 and 200 as they go farther from the liquid crystal layer.

For a uniaxial compensation film, if it is assumed that a direction having the largest or the smallest refractive index is indicated by x axis, two orthogonal axes on a plane perpendicular to the x axis are indicated by y and z axes, respectively, and $nx \neq ny \approx nz$, where nx, ny and nz are the refractive indices in the x, y and z directions, respectively, then the optical axis extends along the nx direction.

The a-plate compensation film is designed such that the optical axes is parallel to the surfaces of the panels 100 and 200. The hybrid c-plate compensation film has a hybrid molecular arrangement and thus the average optical axis makes an angle closer to the right angle rather than to zero degree with respect to the surfaces of the panels 100 and 200, which is different from a normal c-plate compensation film having an optical axis perpendicular to the surfaces of the panels 100 and 200.

It is preferable that the x axis of the a-plate compensation films 601 and 602, i.e., the slow axes along which the refractive indices are the largest for positive compensation films or the smallest for negative ones are aligned parallel or perpendicular to the transmission axes of the adjacent polarization films 501 and 502.

As described above, the a-plate compensation films 601 and 602 have the reverse wavelength dispersion that $\Delta n$ increases as the wavelength of incident light increases, which resolves the blue shift of black state as well as securing wide viewing angle.

The compensation films 601 and 602 having reverse wavelength dispersion may have biaxiality, and it is preferable that $|ny-nz-<0.1\times|nx-nz|$.

Preferably, the retardation value of the a-plate compensation films 601 and 602 ranges about 5 nm through about 45 nm for a light wavelength of about 550 nm, about (0.4-0.7)* (the retardation value for the light wavelength of about 550 nm) for a light wavelength of about 400 nm, and about (1.1-1.4)*(the retardation value for the light wavelength of about 550 nm) for a light wavelength of about 650 nm.

The positions of the a-plate compensation films 601 and 602 and the hybrid c-plate compensation films 701 and 702 may be reversed. One of the a-plate compensation films 601 and 602 having reverse wavelength dispersion and the hybrid c-plate compensation films 701 and 702 may be replaced with a conventional a-plate compensation film having forward wavelength dispersion.

EXPERIMENT 1

The blue shift and the viewing angle characteristic of LCDs including different compensation films, which display black images, as function of the upper-side viewing angle for various cell gaps were calculated by optical simulation.

Figure 2A:
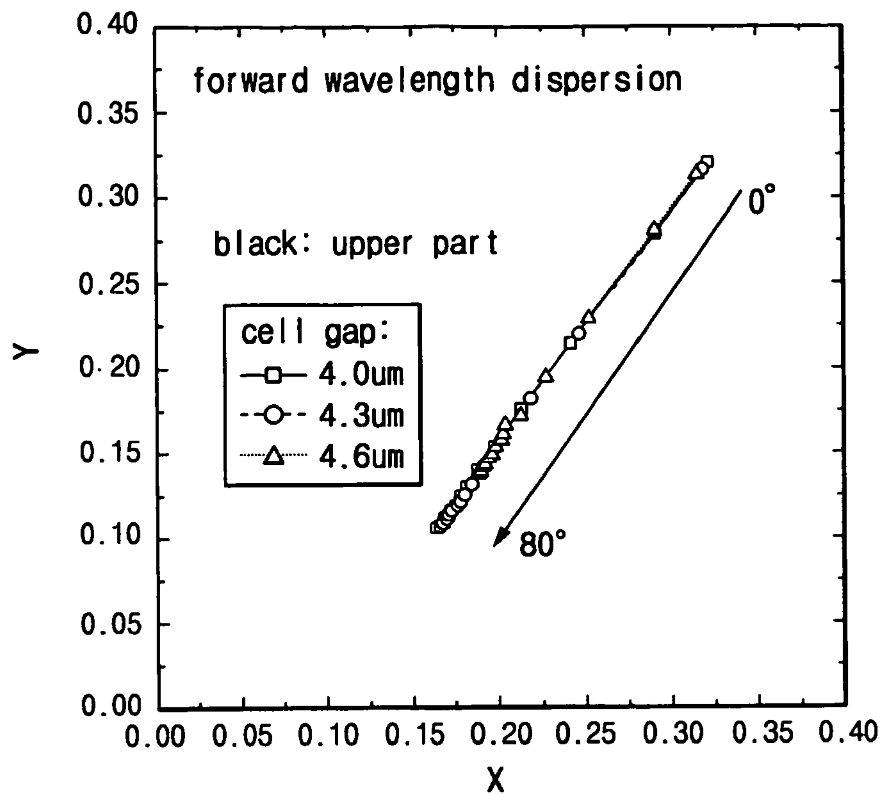
FIG. 2A is a graph showing color coordinates of LCDs including hybrid c-plate compensation films with thickness of about 1.5 microns and a-plate compensation films with forward wavelength dispersion, which display black images, as function of the upper-side viewing angle for various cell gaps.
Figure 2B:
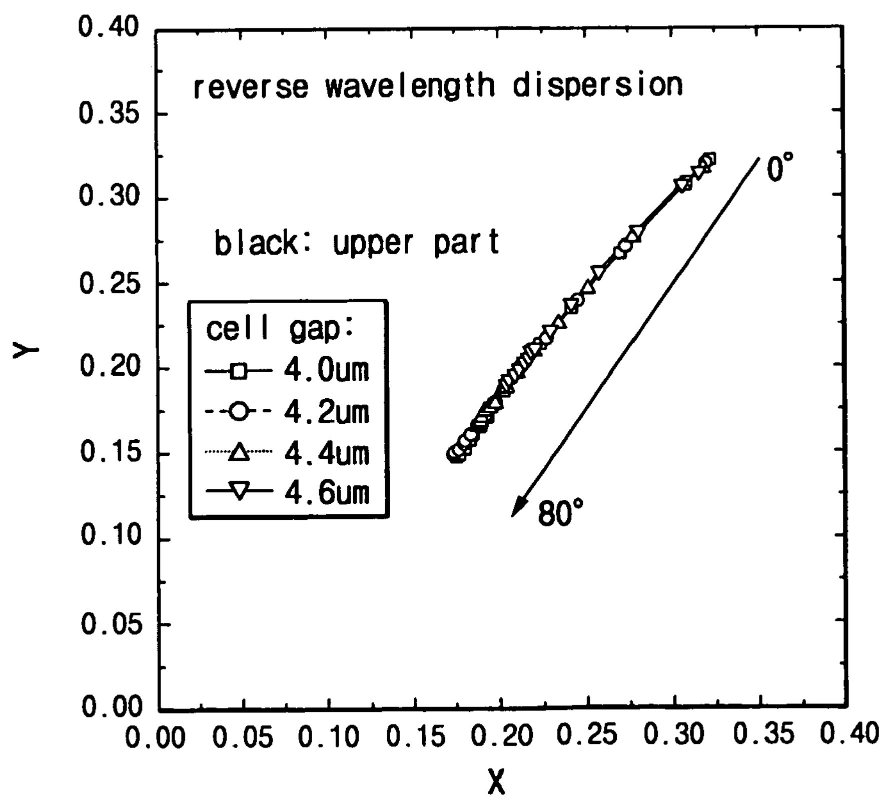
FIG. 2B is a graph showing color coordinates of LCDs including hybrid c-plate compensation films with thickness of about 1.5 microns and compensation films with reverse wavelength dispersion according to an embodiment of the present invention, which display black images, as function of the upper-side viewing angle for various cell gaps.
Figure 2C:
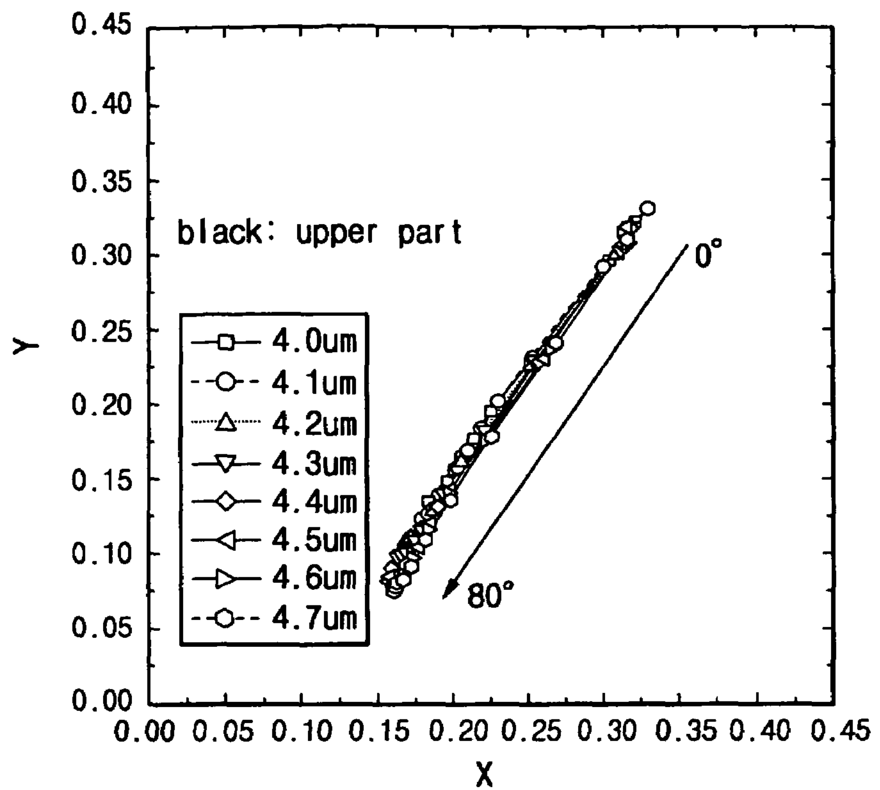
FIG. 2C is a graph showing color coordinates of LCDs including hybrid c-plate compensation films with thickness of about 2 microns, which display black images, as function of the upper-side viewing angle for various cell gaps.

FIGS. 2A to 2C show calculated color coordinates for an LCD including positive a-plate compensation films with forward wavelength dispersion as well as hybrid c-plate compensation films with a thickness of about 1.5 microns, for an LCD including compensation films with reverse wavelength dispersion as well as hybrid c-plate compensation films with a thickness of about 1.5 microns, and for an LCD including hybrid c-plate compensation films with a thickness of about 2 microns without any a-plate compensation film.

The color coordinates were measured from the front direction, i.e., 0° to 80° a long an upper direction with an interval of 5° for various cell gaps of the liquid crystal panel assembly in a range of 4.0-4.7. The values of x and y lower than 0.2 mean the generation of the blue shift.

As shown in FIGS. 2A through 2C, values of x and y decreased due to the increase of the light leakage as the viewing angle increases. The values of x and y shown in FIGS. 2A and 2C severely decrease below 0.2 and thereby cause serious blue shift. However, the values of x and y shown in FIG. 2B for the a-plate compensation films having reverse wavelength dispersion decrease only to about 0.2, which indicates the drastic reduction of the blue shift.

Next, the viewing angle characteristics of LCDs including different compensation films as function of the cell gap were calculated by optical simulation.

Figure 3A:
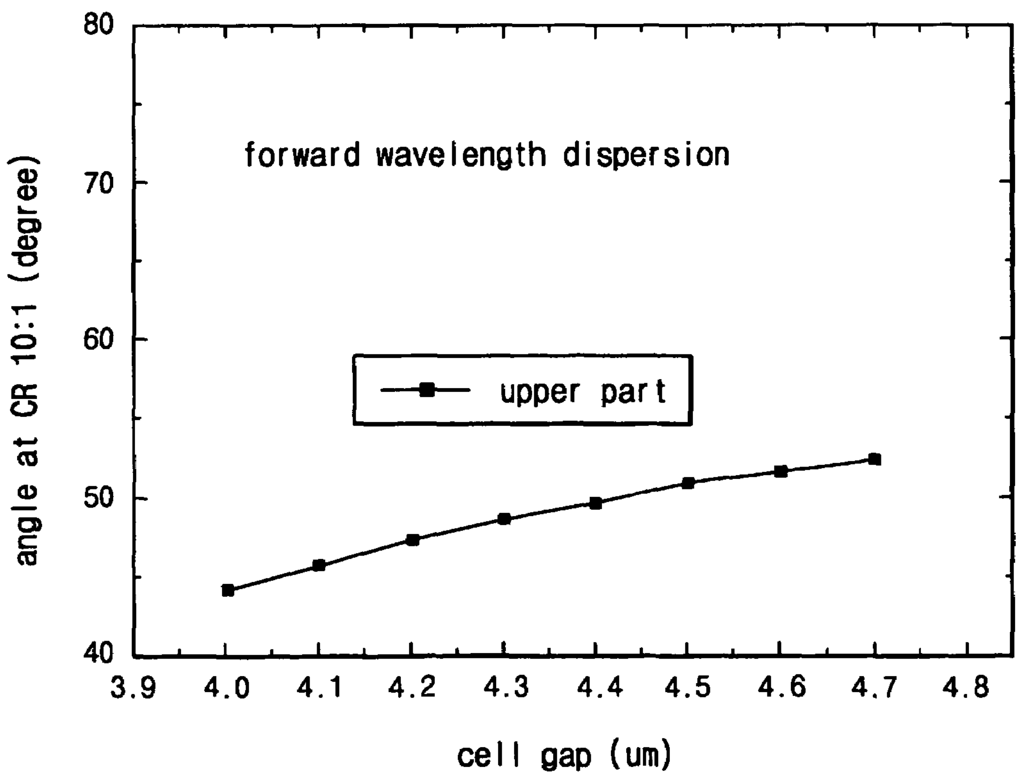
FIG. 3A is a graph showing viewing angle characteristic of LCDs including hybrid c-plate compensation films with thickness of about 1.5 microns and conventional a-plate compensation films having forward wavelength dispersion.
Figure 3B:
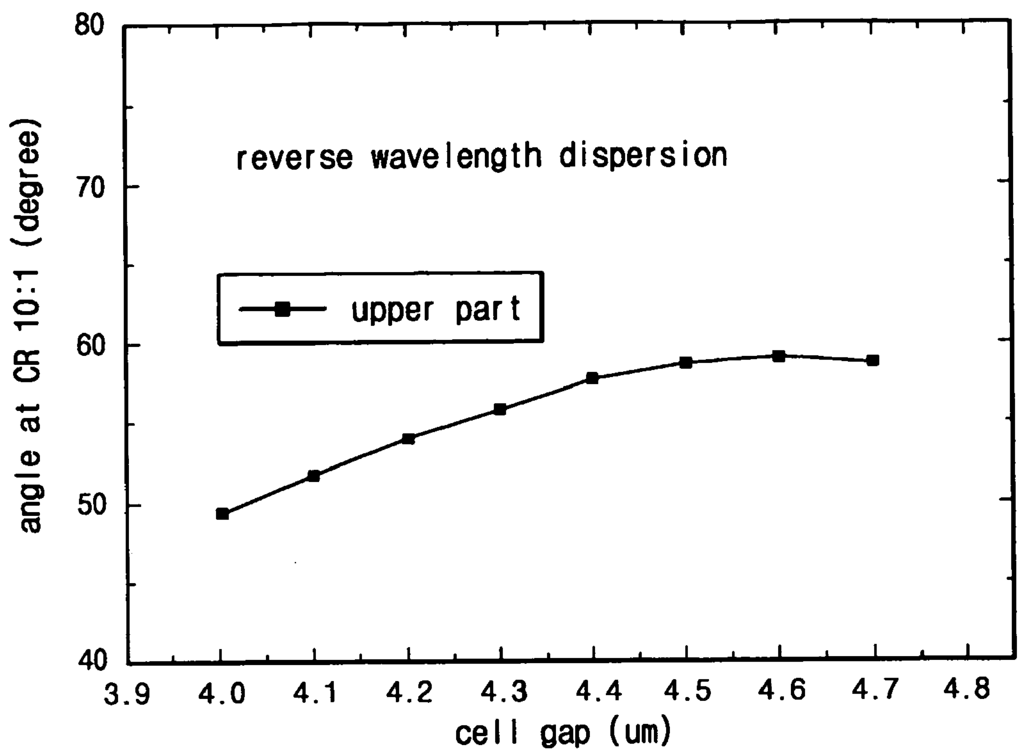
FIG. 3B is a graph showing viewing angle characteristic of LCDs including hybrid c-plate compensation films with thickness of about 1.5 microns and compensation films having reverse wavelength dispersion according to an embodiment of the present invention.
Figure 3C:
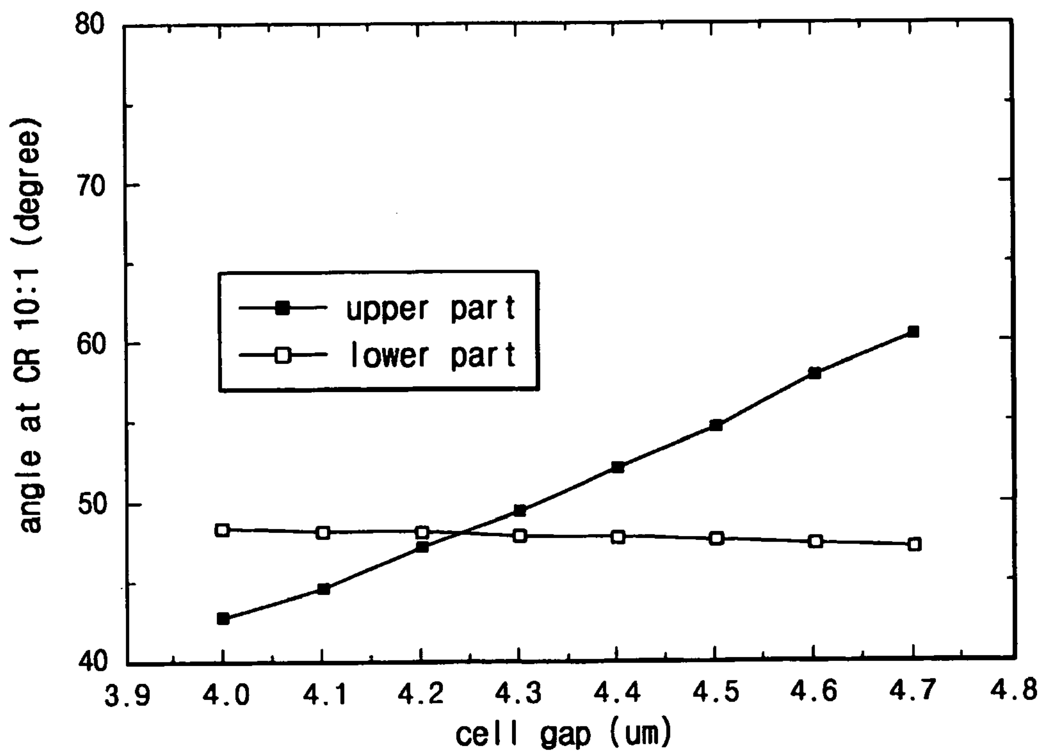
FIG. 3C is a graph showing viewing angle characteristic of LCDs including hybrid c-plate compensation films with thickness of about 2 microns.

FIGS. 3A through 3C are graphs showing the calculated viewing angle characteristics for positive a-plate compensation films having forward wavelength dispersion, compensation films having reverse wavelength dispersion, and hybrid c-plate compensation films with a thickness of about 2 microns are used. Here, the viewing angle is defined as an angle giving contrast ratio of 10:1.

As shown in FIG. 3A, the measured viewing angle for the a-plate compensation films having forward wavelength dispersion was as narrow as in a range of about 40°-50°, while, as shown in FIG. 3B, the measured viewing angle for the compensation films having reverse wavelength dispersion was as wide as in a range of 50°-60° and increases as the cell gap increases. In the meantime, for the hybrid c-plate compensation films shown in FIG. 3C, the measured upper-side viewing angle was as wide as in a range of 45°-60°, while the measured lower-side angle was as low as 45°-50°. The measured viewing angles for the left and right sides are larger than 80° in all three cases.

EXPERIMENTS 2

The blue shift and viewing angle characteristics for LCDs having a-plate compensation films having various retardation values, which display white or black images, as function of the upper-side viewing angle were measured.

The color coordinates were measured in the same range and with the same interval as in the EXPERIMENT 1 for a-plate compensation films with forward wavelength dispersion having a retardation value of 40 nm and a-plate compensation films with reverse wavelength dispersion having retardation values of 20 nm, 25 nm, 30 nm, 35 nm and 40 nm.

Figure 4A:
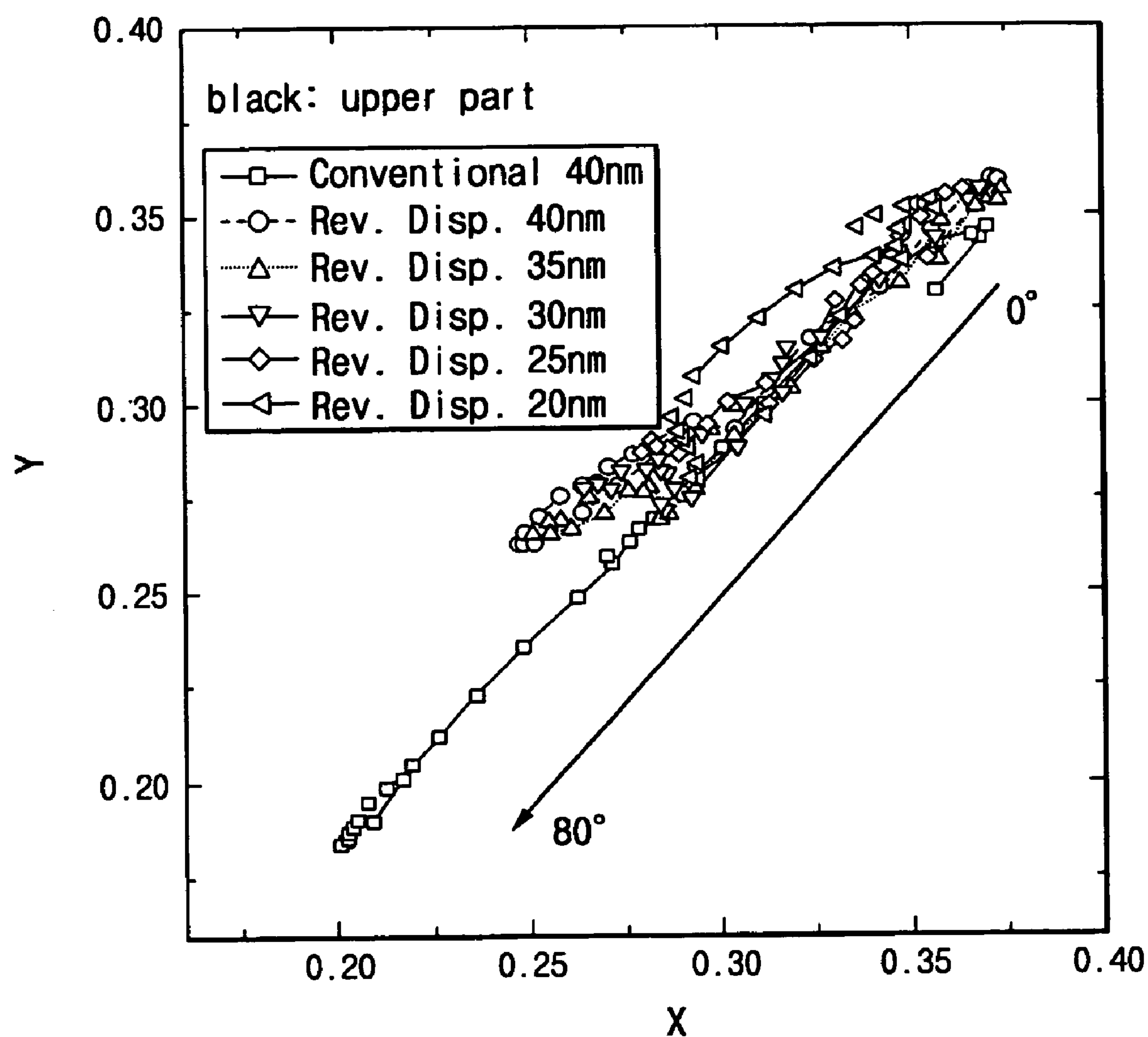
FIGS. 4A and 4B are graphs showing color coordinates characteristics of LCDs, which display a black image and a white image, respectively, as function of the upper-side viewing angle for different types and the retardation values of compensation films.
Figure 4B:
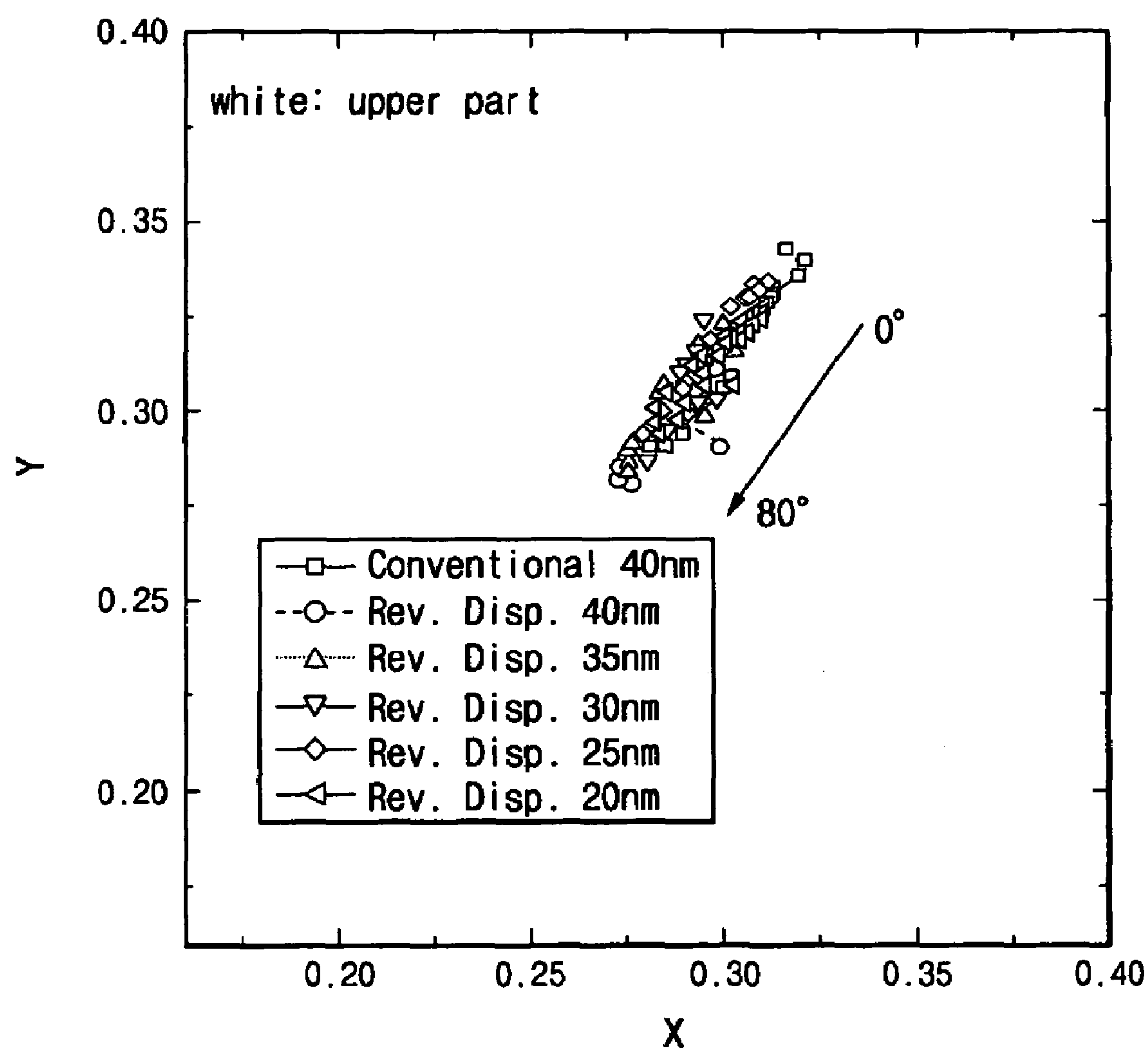

FIGS. 4A and 4B show the calculated color coordinates for an LCD displaying a black image and a white image, respectively. In FIGS. 4A and 4B, the legend “Conventional” indicates the case with the a-plate compensation films having forward wavelength dispersion, and “Rev.Disp” indicates the case with the a-plate compensation films having reverse wavelength dispersion.

As shown in FIG. 4A, the conventional case shows severe blue shift in the black image, while the blue shift dramatically decreases when using the a-plate compensation films having reverse wavelength dispersion. Particularly, the measured color coordinates for the a-plate compensation film having reverse wavelength dispersion of 20 nm has a minimum value of (0.294, 0.280), which hardly shows the blue shift.

As shown in FIG. 4B, the blue shift is not generated in the LCDs displaying a white image regardless of the types of the wavelength dispersion of the a-plate compensation films.

FIG. 5 is a table showing viewing angle characteristics as function of the type and the retardation value of the compensation film of an LCD. Here, the viewing angle is defined as the angle giving contrast ratio of 10:1.

As shown in FIG. 5, the measured viewing angle for the a-plate compensation films having forward wavelength dispersion was as narrow as equal to or less than 60°, while the measured viewing angle for the compensation films having reverse wavelength dispersion was as good as larger than 60°.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display comprising:
- a liquid crystal panel assembly including two panels and a liquid crystal layer interposed between the panels and having first and second outer surfaces opposite each other;
- first and second polarizers on the first and the second surfaces of the panel assembly, respectively;
- a first a-plate film with reverse wavelength dispersion that birefringence increases as a wavelength of incident light increases, and is inserted between the first polarizer and the first surface of the panel assembly;
- a first hybrid c-plate compensation film inserted between the first a-plate film and the first polarizer;
- a second a-plate film with reverse wavelength dispersion inserted between the second polarizer and the second surface of the panel assembly; and
- a second hybrid c-plate compensation film between the second a-plate film and the second polarizer,
- wherein a retardation value of the first a-plate film ranges about 5 nm through about 45 nm for a light wavelength of about 550 nm, about (0.4-0.7)*(the retardation value for the light wavelength of about 550 nm) for a light wavelength of about 400 nm, and about (1.1-1.4)*(the retardation value for the light wavelength of about 550 nm) for a light wavelength of about 650 nm.

2. The liquid crystal display of claim 1, wherein the first a-plate film satisfies the condition that $|ny-nz|<0.1*|nx-nz|$.

3. The liquid crystal display of claim 1, wherein the liquid crystal layer has a twisted nematic configuration in which liquid crystal molecules in the liquid crystal layer are aligned parallel to the panels and spirally twisted from one of the panels to the other.

4. The liquid crystal display of claim 1, wherein the liquid crystal panel assembly is a vertically aligned configuration in which liquid crystal molecules in the liquid crystal layer are aligned perpendicular to the panels.

5. A liquid crystal display comprising:
- a liquid crystal panel assembly including two panels and a liquid crystal layer interposed between the panels and having first and second outer surfaces opposite each other;
- first and second polarizers on the first and the second surfaces of the panel assembly, respectively;
- a first a-plate film with reverse wavelength dispersion that birefringence increases as a wavelength of incident light increases, and is inserted between the first polarizer and the first surface of the panel assembly;
- a first hybrid c-plate compensation film inserted between the second surface of the panel assembly and the second polarizer or between the first a-plate film and the first polarizer; and
- a second a-plate film with reverse wavelength dispersion inserted between the second polarizer and the second surface of the panel assembly and a second hybrid c-plate compensation film, the first and the second hybrid c-plate compensation films inserted between the first a-plate film and the first polarizer and between the second a-plate film and the second polarizer, wherein a cell gap between the panels of the panel assembly ranges about 3.5-4.5 microns and a retardation value of the liquid crystal layer is in a range of about 0.35-0.48.

6. The liquid crystal display of claim 5, wherein the first a-plate film satisfies the condition that $|ny-nz|<0.1*|nx-nz|$.

7. A liquid crystal displav comprising:

a liquid crystal panel assembly including two panels and a liquid crystal layer interposed between the panels and having first and second outer surfaces opposite each other;

first and second polarizers on the first and the second surfaces of the panel assembly, respectively;

a first a-plate film with reverse wavelength dispersion that birefringence increases as a wavelength of incident light increases, and is inserted between the first polarizer and the first surface of the panel assembly;

a first hybrid c-plate compensation film inserted between the second surface of the panel assembly and the second polarizer or between the first a-plate film and the first polarizer; and a second a-plate film with reverse wavelength dispersion inserted between the second polarizer and the second surface of the panel assembly and a second hybrid c-plate compensation film, the first and the second hybrid c-plate compensation films inserted between the first a-plate film and the first polarizer and between the second a-plate film and the second polarizer, wherein a cell gap between the panels of the panel assembly ranges about 3.5-4.0 microns and a retardation value of the liquid crystal layer is in a range of about 0.25-0.35.

8. The liquid crystal display of claim 7, wherein the first a-plate film satisfies the condition that $|ny-nz|<0.1*|nx-nz|$.

* * * * *

UNITED STATES PATENT AND TRADEMARK OFFICE

CERTIFICATE OF CORRECTION

PATENT NO. : 7,649,599 B2
APPLICATION NO. : 10/510077
DATED : January 19, 2010
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 646 days.

Signed and Sealed this

Twenty-third Day of November, 2010

David J. Kappos

*Director of the United States Patent and Trademark Office*